Figure 1:
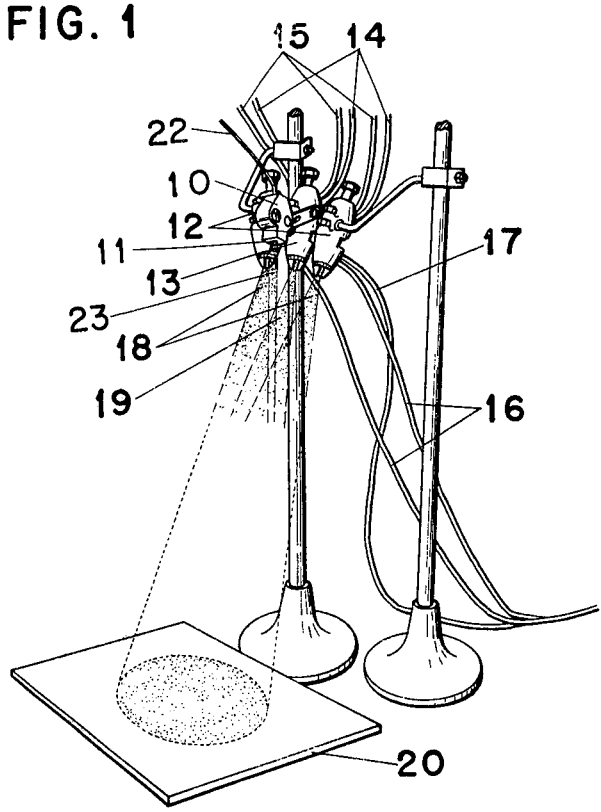

United States Patent [19]

Oda et al.

[11] 3,967,004

[45] June 29, 1976

[54] METHOD FOR THE PRODUCTION OF FIBER-REINFORCED RESIN COMPOUNDS

[76] Inventors: Kouzou Oda, No. 436-1, Yashiro, Yashiro-cho; Hidefumi Miki, No. 449-1, Yashiro, Yashiro-cho, both of Kato, Hyogo, Japan

[22] Filed: Dec. 17, 1973

[21] Appl. No.: 425,129

Related U.S. Application Data

[63] Continuation-in-part of Ser. No. 284,055, Aug. 28, 1972, abandoned.

[52] U.S. Cl. .............................. 427/196; 427/426
[51] Int. Cl.² ....................... B05D 1/34; B05D 1/36
[58] Field of Search ............. 117/26, 27, 28, 105.5; 427/196, 426

[56] References Cited
UNITED STATES PATENTS

| | | | |
|---|---|---|---|
| 2,632,751 | 3/1953 | Anderson | 260/40 R |
| 2,646,416 | 7/1953 | Parker | 260/40 R |
| 2,652,383 | 9/1955 | Davis | 117/161 K |
| 2,786,716 | 3/1957 | Peeps | 117/105.5 |
| 2,813,751 | 11/1957 | Barrett | 117/105.5 |
| 2,890,836 | 6/1959 | Gusmer et al. | 118/300 X |
| 3,033,472 | 5/1962 | Shelton | 117/105.5 X |
| 3,077,424 | 2/1963 | Maker et al. | 260/40 R |
| 3,096,225 | 7/1963 | Carr et al. | 117/105.5 X |
| 3,249,304 | 5/1966 | Faro et al. | 117/105.5 X |
| 3,414,424 | 12/1968 | Peeps et al. | 117/105.5 X |
| 3,676,197 | 7/1972 | Harrison et al. | 117/105.5 |
| 3,676,198 | 7/1972 | McGoarty | 117/105.5 |
| 3,754,977 | 8/1973 | Lankheet | 117/105.5 |
| 3,846,164 | 11/1974 | Lagache et al. | 117/161 K X |

*Primary Examiner*—Harry J. Gwinnell
*Assistant Examiner*—Shrive P. Beck
*Attorney, Agent, or Firm*—Armstrong, Nikaido & Wegner

[57] ABSTRACT

A method for the production of a fiber-reinforced resin compound. The method comprises spraying onto a suitable substrate from three respectively different nozzles:

1. an unsaturated polyester resin composition having a viscosity of about 3000 to 15000 Cps at 25°C;
2. a fiber-reinforcing material and
3. a thickening agent of magnesium oxide, magnesium hydroxide, calcium oxide, calcium hydroxide or beryllium oxide suspended in a liquid polyester resin or a mixture of a liquid polyester resin and styrene, the weight of (1):(2):(3) being 100:20–55:3–30. The individual streams of (1), (2) and (3) intersect one another after exiting from said nozzles and prior to contacting said substrate to form one stream. The method can give a fiber reinforced resin compound having a strength equivalent to or more that of (sheet molding compound) and is simple in operation and can be carried out at a cost equivalent to or less than that (bulk molding compound).

4 Claims, 2 Drawing Figures

METHOD FOR THE PRODUCTION OF FIBER-REINFORCED RESIN COMPOUNDS

CROSS REFERENCE TO PRIOR APPLICATION

This is a continuation-in-part of our copending application U.S. Ser. No. 284,055, filed Aug. 28, 1972 now abandoned.

The present invention is concerned with a method for the production of fiber-reinforced resin compounds which are useful as materials for preparing molded resin articles.

As fiber-reinforced resin compounds useful as materials for preparation of molded resin articles, there have been known and employed so-called bulk molding compound (BMC) and sheet molding compound (SMC). However, BMC and SMC are not free of disadvantages from an industrial point of view. That is, BMC is prepared by mixing and kneading thoroughly a resin component, a reinforcing material, a thickening agent and other additives such as a filler, a coloring agent, and so on, with one another, by means of, for example, a kneader, etc., followed by aging so as to increase the viscosity of the composition. In this process, however, the reinforcing material is damaged by the kneading procedure and thus the mechanical properties of the molded article prepared from the BMC compound. On the other hand, SMC has been prepared by the following steps; a mat or sheet like material is prepared from reinforcing material, and then this material is impregnated with a mixture of a resin component, a thickening agent and other additives such as a filler, a coloring agent, etc. But, in this process, the preparation of the mat or sheet like material requires rather high cost and skillful and complicated procedures, and further, the impregnation process requires skillful and troublesome techniques. Still further, it is substantially impossible to prepare a sheet like material of thickness of higher than about 4 mm or a material of other form than sheet.

Under the circumstances the present inventors have made extensive and intensive studies for finding out a procedure for the production of a fiber-reinforced resin composition useful as materials for preparation of molded resin articles, which is not accompanied by the drawbacks as encountered with the known methods, and ultimately have reached a finding that by spraying an unsaturated polyester resin composition of specified viscosity range, a fiber-reinforcing material and a thickening agent dissolved or suspended in a liquid polyester resin, or a mixture of liquid polyester resin and styrene, under intimately contacting with one another during the spraying step onto a suitable substrate, a fiber-reinforced unsaturated polyester resin compound can be obtained, and that this compound can be used as a material for preparation of a molded resin article quite similarly to SMC and thus produced article shows excellent mechanical properties. Additionally, it is easily possible to prepare a sheet like material of thickness of higher than about 4 mm or materials of other form than sheet.

The present invention was accomplished on the basis of these findings.

Thus, the principal and essential object of the present invention is to provide a novel and improved method for the production of a fiber-reinforced resin compound useful as a material for preparation of molded article having excellent machanical properties.

According to the method of the present invention, a fiber-reinforced resin compound, which can be used as a material for preparation of a fiber-reinforced molded resin article quite similarly to conventional BMC and SMC, can be produced after a simpler process at rather lower cost, and further the molded article prepared from this compound shows excellent mechanical properties, comparable with the case of SMC.

The essential feature of the method of the present invention lies in that (1) an unsaturated polyester resin composition of viscosity of 3,000 to 15,000 cps, (2) a fiber-reinforcing material, and (3) a thickening agent dissolved or suspended in a liquid polyester resin or a mixture of a liquid polyester resin and styrene, are sprayed onto a suitable substrate, under intimately contacting with one another at the spraying stage, followed by aging so as to increase the viscosity.

The component (1), the unsaturated polyester resin composition, comprises an unsaturated polyester, a polymerization catalyst and a filler as the essential ingredients, as well as other additives such as a releasing agent, a coloring agent, etc., the unsaturated polyester comprising unsaturated ester polymer, styrene and a small amount of inhibitor. The unsaturated ester polymer is one prepared from a polyhydric alcohol component (e.g. ethylene glycol, propylene glycol diethylene glycol, etc.) and an acid component such as dibasic unsaturated carboxylic acid (e.g. maleic acid, fumaric acid, itaconic acid, etc.) and saturated dicarboxylic acid (e.g. phthalic acid, isophthalic acid, etc.). The molecular weight of the unsaturated ester polymer ranges from about 600 to about 5,000, more preferably about 1,000 to about 3,000, and the acid value of the polyester ranges from about 5 to about 60, for example, to 100 weight parts of the unsaturated ester polymer are added about 80 to 120 weight parts of styrene and 0.01 to 0.05 weight part of an inhibitor such as hydroqunione to give a conventional unsaturared polyester. The filler usable includes, for example, calcium carbonate, clay, barium sulfate, aluminum hydroxide, etc. The releasing agent usable includes, for example, zinc stearate, etc. The polymerization catalyst usable includes, for example, organic peroxides such as benzoyl peroxide, t-butyl perbenzoate, t-butyl peroctoate, lauroyl peroxide, dicumyl peroxide, etc. As the coloring agent, a suitable one may be selected in accordance with the desired color of molded articles.

Amounts of the filler, the releasing agent, the polymerization catalyst and the coloring agent can be selected from rather a wide range, and in general, about 50 to about 150 for the filler, about 1 to about 8 for the releasing agent, about 0.5 to about 3 for the catalyst and about 1 to about 10 for the coloring agent, all being relative to 100 weight parts of the unsaturated polyester.

The viscosity (25°C) of the unsaturated polyester resin composition falls within a range of from about 3,000 to about 15,000 cps, more desirably about 3,000 to about 10,000 cps. For this purpose, generally, it is required that the viscosity of the unsaturated polyester resin itself falls within about 80 to about 500 cps (at 25°C). In the present method, commercially available unsaturated polyester resin consisting of an unsaturated esterpolymer and styrene can be employed as a starting material, but the viscosity of the commercially available resin is too high for the purpose of the present invention. Thus, when the commercially available resin is used, this resin is further mixed with styrene. An amount of styrene to be mixed with the resin is about 5 to about 10 weight percent relative to the resin in case of rather low viscous resin e.g. viscosity (25°C) of about 300 cps, or about 20 to about 30 weight percent relative to the resin in case of rather high viscous resin e.g. viscosity (25°C) of about 1,000 cps.

The fiber reinforcing material usable includes, for example, glass fiber, carbon fiber, cotton fiber, polyvinyl alcohol fiber, polyamide fiber, polyester fiber, etc., among which glass fiber is most desirable. The fiber reinforcing material is practically used in the form of chopped strands of about 25mm to about 50mm.

The thickening agent employable includes, for example, magnesium oxide, magnesium hydroxide, calcium oxide, calcium hydroxide, beryllium oxide, and the like, among which magnesium oxide is most desirable.

The liquid polyester resin used for dissolving or suspending the thickening agent is similar to the polyester resin in the component (1), so far as it is not thickened by the thickening agent and has rather a low molecular weight. The most typical example of the liquid unsaturated polyester is one prepared from 100 mole % of diethylene glycol and 60 mole % of furmaric acid, and having average molecular weight of about 330.

An amount of the liquid polyester resin or a mixture of styrene and the liquid polyester resin to be used for suspending the thickening agent is about 2 to about 5 times by weight relative to the thickening agent.

The suspension of the thickening agent is used in an amount of about 3 to about 30 weight parts relative to 100 weight parts of the unsaturated polyester resin in the resin composition.

An amount of the fiber reinforcing material to be used is about 20 to about 55 weight parts relative to 100 weight parts of the resin composition.

The three components are sprayed onto a substrate, under intimately contacting with one another at the spraying stage. For this purpose, for example, the three components are sprayed from the respectively different nozzles in such a manner that the sprayed streams are combined in one stream. The diameter of the nozzle is about 2.5 to about 3.0 mm. The distance between the outlet of the nozzle and the substrate is about 50 to about 200 cm. The spraying is conducted generally at normal temperature.

For the spraying, two or more different nozzles may be used for any one of the three components in order to make the intimate contact of the three components more completely. For example, it is recommended that one nozzle i.e. a chopped strand-feeder equipped with a roving cutter, for the component 2, one nozzle for the component 3 and two nozzles for the component 1 are used.

The spraying can be conducted by using a conventional multihead spray-gun or similar apparatus. FIG. 1 is a typical example of spraying apparatus, and FIG. 2 is a cross-section of a part of FIG. 1.

Figure 2:
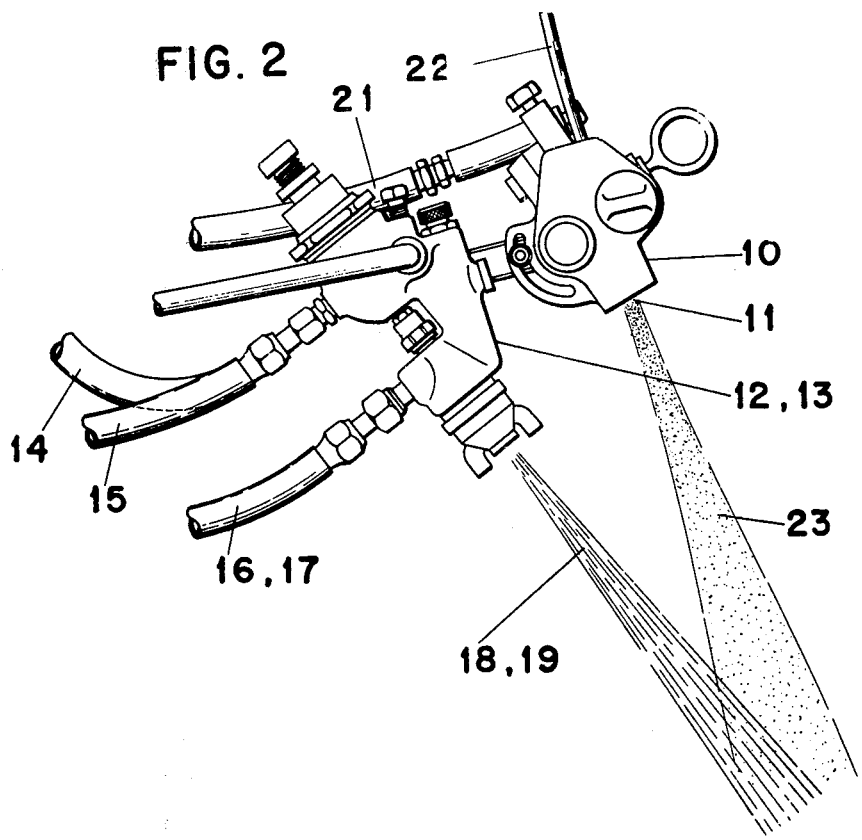

In FIGS. 1 and 2, numerals 12 and 13 designate conventional automatic spray guns (available under the trade name of BINKS MODEL 61 or MODEL 610). From the gun 13 is sprayed the thickening agent component, and from the guns 12 is sprayed the resin component. Air hoses 14 connected to the guns 12 and 13 are to supply the air for automatic operation into the guns. Air hoses 15 supply the air for spraying the resin component and the thickening agent component. The air supplied from the hoses 14 is adapted to automatically open valves in the guns. The resin component is supplied into the gun through hoses 16, and the thickening agent component is supplied into the gun through hoses 17. When air is supplied into the gun through the hoses 15, the resin component is sprayed 18 from the gun 12 and the thickening agent component is sprayed 19 from the gun 13. The sprayed components 18 and 19 are mixed and sprayed onto a plate 20. As seen from FIGS. 1 and 2, a roving cutter is fixedly provided on the gun 13. When air is supplied through a hose 21, a roving 22 is chopped by means of a cutter 10 and then blown 23 against the plate 20 through an outlet 11 of the cutter 10.

The substrate may be any of per se known ones which have been used for similar purposes, such as sheets, films, plates, disks, and other molded articles, which are made of metals, wood, plastics, and other materials.

In the present invention, fiber-reinforced resin compounds of various forms or shapes (e.g. sheet-like, bulky, disk-like, etc.) can be formed on the substrate by controlling the angles and/or directions of the nozzles and/or by moving the nozzles suitably.

After the spraying is over, the resultant is aged by heating at about 30° to about 80°C, so as to increase the viscosity. Heating period is generally about 3 hours to about 3 days.

The thus obtained compounds per se, or after removing the substrate, can be stored safely. Particularly, when a plastic film (e.g. polyethylene film, polypropylene film, etc.) is used as the substrate, it is recommended that the resulting compound on the film is further coated with a plastic film as mentioned above to give a compound inserted into the two plastic films, and thus obtained material is stored.

The compound is placed in a suitable mold of the desired shape and heated under pressure to cure the same, whereby the fiber-reinforced molded resin article is obtained.

EXAMPLE 1

A molding compound of the present invention and a control SMC compound were both prepared in a conventional manner under the same conditions. Molded articles were prepared from these compounds, and their properties were examined. The result is summarized in the following Table.

| Molding compound | SMC | molding compound of the present invention |
|---|---|---|
| Formulation: | | |
| Resin composition | | |
| unsaturated esterpolymer prepared from 40 mol of isophthalic acid, 60 mol of maleic anhydride and 100 mol of propylene glycol; dissolved in styrene | 95 wt. | 83 |

-continued

| Molding compound | SMC | molding compound of the present invention |
|---|---|---|
| (100 weight parts of esterpolymer in 75 weight parts of styrene); containing 0.03 weight part per 100 weight parts of the resin of hydroquinone; acid value of the polyester being 14 and viscosity being 1000 cps (25°C) | parts | |
| styrene | 5 | 17 |
| calcium carbonate | 130 | 130 |
| tert.-butyl peroxy benzoate | 1 | 1 |
| zinc stearate | 6 | 6 |
| coloring agent | 3 | 3 |
| Viscosity**(25°C) of the Liquid unsaturated polyester resin | 800 cps | 220 cps |
| Viscosity (25°C) of the resin composition | 15800 cps | 9800 cps |
| Thickening agent MgO (containing MgO 90.67% $CO_2$ 2.66% and $H_2O$ 6.67%) suspended in polyester which is prepared from 60 mol of fumaric acid and 100 mol of diethylene glycol; acid value being less than 2 | 8 | 8 |
| Reinforcing material 1" chopped glass (soft type, glass content%) | 25 | 20 |

**measured by Brookfield type viscometer Model BH (Tokyo Keiki Co.) spindle No. 4, 10 rpm (25°C)

| Preparation of molding compound | Blending the resin paste in a tank and blending the paste with the thickening agent in another tank, followed by shaping into a sheet of 3mm thick by a conventional SMC machine | spraying into a spot resin paste and thickening agent paste through different nozzles while adding chopped glass, to give a sheet of 10 mm thickness |
|---|---|---|
| Workability of compound | 10 to 20 minutes | non-limited |
| Properties of molded article (145°C for 5 minutes under 100kg/cm²) | | |
| Bending strength | 22.2 kg/mm² | 20.5 |
| Tensile strength | 8.36 kg/mm² | 8.45 |
| Specific gravity | 1.830 | 1.827 |
| Immersion test in boiling water | | |
| Water absorption after 280 hrs. | 1.3% | 1.1 |
| blistering | 280 hours | 520 |

EXAMPLE 2

After a similar manner to the Example 1, molding compound of the present invention and control SMC and BMC were prepared, and molded articles were also prepared therefrom. The result is summarized in the following Table.

| Molding compound | BMC | SMC | the present invention |
|---|---|---|---|
| Resin composition | | | |
| unsaturated polyester* viscosity of 400 cps at 25°C | 100 | 100 | 90 ⎫ 160 cps (25°C) |
| Styrene | — | — | 10 ⎭ |
| $CaCO_3$ | 200 | 100 | 100 |
| tert.-butyl peroxy | 1 | 1 | 1 |

| Molding compound | BMC | SMC | the present invention |
|---|---|---|---|
| benzoate | | | |
| zinc stearate | 6 | 6 | 6 |
| coloring agent | 3 | 3 | 3 |
| Viscosity of the composition (spindle No.) | 72000 pcs (6) | 10800 (4) | 7200 (4) |
| Thickening agent MgO/liq. polyester**/ styrene = 1/2/1 (by weight) | 2 | 8 | 8 |
| Reinforcing material (chopped glass) contect, % | ⅛in. 15 | 1 in. 30 | 1 in. 30 |
| Workability of compound | 20 min. | 10 to 20 min. | non-limited |
| Properties of molded article (140°C, 70kg/cm², 3 min) | | | |
| Flexural strength | 7.3 mg/mm² | 17.3 | 20.0 |
| Tensile strength | 2.6 kg/mm² | 7.2 | 8.6 |
| Specific gravity | 1.98 | 1.81 | 1.80 |

*Polyester resin consisting of 66 parts of a polyester prepared from 50 mol % of maleic anhydride, 50 mol % of phthalic anhydride and 100 mol % of propylene glycol, 34 parts of styrene and 0.02 part of hydroquinone; acid value of 18.
**Polyester prepared from 60 mol % of fumaric acid and 100 mole % of diethylene glycol; acid value of less than 2 and viscosity of 1700 cps at 25°C.

EXAMPLE 3

The formulation was prepared after a similar manner to Example 1, mixing being in a tank: 100 parts of a resin (POLYMAL 6709 of Takeda, Japan), 130 parts of a calcium carbonate filler (SL No. 300 of Takehara Chemical, Japan), 3 parts of a coloring agent (Toner No. 9 of Takeda, Japan), 1 part of tert.-butyl perbenzoate hardening agent, 6 parts of zinc stearate parting agent, 10 parts of styrene monomer as a diluent, 2 parts of magnesium oxide as a thickener and 25% by weight glass fibers. The product produced from this conventional SMC resin composition was, because of high viscosity, impossible to spray 10–20 minutes after mixing. A bending strength of 22.2 kg/mm² was observed, together with a tensile strength of 8.36 kg/mm². The specific gravity was 1,830.

EXAMPLE 4

The procedure of Example 2 was repeated, except that a spray gun was used for mixing, with the following formulation: 100 parts of a resin (POLYMAL 6709 of Takeda, Japan), 130 parts of a calcium carbonate filler (SL No. 300 of Takehara Chemical, Japan), 3 parts of a coloring agent (Toner No. 9 of Takeda, Japan), 1 part of tert.-butyl perbenzoate hardening agent, 6 parts of zinc stearate parting agent, 20 parts of styrene monomer as a diluent, 6 parts of magnesium oxide as a thickener and 20% by weight of glass fibers. A bending strength of 20.5 kg/mm² was observed, together with a tensile strength of 8.45 kg/mm². The specific gravity was 1.827.

Although with the product of Example 1 it was impossible to spray after 10 or 20 minutes, the product of the example was found sprayable even a few days after mixing.

What we claim is:
1. A method for the production of a fiber-reinforced resin compound, which comprises spraying onto a suitable substrate from three respectively different nozzles:
   1. an unsaturated polyester resin composition having a viscosity of about 3000 to 15000 Cps at 25°C;
   2. a fiber-reinforcing material and
   3. a thickening agent consisting essentially of magnesium oxide, magnesium hydroxide, calcium oxide, calcium hydroxide or beryllium oxide suspended in a liquid polyester resin or a mixture of a liquid polyester resin and styrene the amount of liquid resin being about 2 to 5 times by weight of the thickening agent, the weight of (1):(2):(3) being 100:20–55:3–30; said three respective streams of (1), (2) and (3) intersecting one another after exiting from said nozzles and prior to contacting said substrate to form one stream.
2. The method according to claim 1, wherein the unsaturated polyester resin composition contains an unsaturated esterpolymer, styrene, a polymerization catalyst, a filler, a releasing agent and a coloring agent.
3. The method according to claim 1, wherein the thickening agent is magnesium oxide suspended in a mixture of styrene and a liquid polyester resin.
4. The method according to claim 1, wherein the fiber-reinforcing material is glass fiber in the form of chopped strands of about 25 mm to about 50 mm.

* * * * *

UNITED STATES PATENT OFFICE
CERTIFICATE OF CORRECTION

Patent No. 3,967,004             Dated June 29, 1976

Inventor(s)        KOUZOU ODA ET AL

It is certified that error appears in the above-identified patent and that said Letters Patent are hereby corrected as shown below:

The Abstract of the Disclosure:

Line 19: at the end of the line insert "than".

Line 20: before "(sheet molding compound)" insert --SMC--, and

Line 22: before "(bulk molding" insert --of BMC--.

Signed and Sealed this

Eighth Day of February 1977

[SEAL]

*Attest:*

RUTH C. MASON
*Attesting Officer*

C. MARSHALL DANN
*Commissioner of Patents and Trademarks*